US012544012B2

(12) United States Patent
Rezai et al.

(10) Patent No.: US 12,544,012 B2
(45) Date of Patent: Feb. 10, 2026

(54) PREDICTING WELLNESS OF A USER WITH MONITORING FROM PORTABLE MONITORING DEVICES

(71) Applicant: West Virginia University Board of Governors on behalf of West Virginia University, Morgantown, WV (US)

(72) Inventors: Ali Rezai, Morgantown, WV (US); Victor Finomore, Morgantown, WV (US); Pierre D'Haese, Morgantown, WV (US); Clay Marsh, Morgantown, WV (US)

(73) Assignee: WEST VIRGINIA UNIVERSITY BOARD OF GOVERNORS ON BEHALF OF WEST VIRGINIA UNIVERSITY, Morgantown, WV (US)

( * ) Notice: Subject to any disclaimer, the term of this patent is extended or adjusted under 35 U.S.C. 154(b) by 417 days.

(21) Appl. No.: 17/913,190

(22) PCT Filed: Mar. 29, 2021

(86) PCT No.: PCT/US2021/024617
§ 371 (c)(1),
(2) Date: Sep. 21, 2022

(87) PCT Pub. No.: WO2021/195616
PCT Pub. Date: Sep. 30, 2021

(65) Prior Publication Data
US 2023/0140151 A1    May 4, 2023

Related U.S. Application Data

(60) Provisional application No. 63/032,036, filed on May 29, 2020, provisional application No. 63/000,607, filed on Mar. 27, 2020.

(51) Int. Cl.
*A61B 5/00* (2006.01)
*A61B 5/024* (2006.01)
(Continued)

(52) U.S. Cl.
CPC ........ *A61B 5/7264* (2013.01); *A61B 5/02405* (2013.01); *A61B 5/165* (2013.01); *A61B 5/7275* (2013.01)

(58) Field of Classification Search
CPC .................................................. A61B 5/7264
See application file for complete search history.

(56) References Cited

U.S. PATENT DOCUMENTS

2004/0260169 A1* 12/2004 Sternnickel ............ A61B 5/726
600/509
2010/0016745 A1*  1/2010 Crump .................. A61B 5/1117
340/539.12

(Continued)

OTHER PUBLICATIONS

PCT International Search Report for corresponding International Application Serial No. PCT/US2021/024617, mailed Jul. 8, 2021, 1 page.

(Continued)

*Primary Examiner* — Benjamin J Klein
*Assistant Examiner* — Thien Jason Tran
(74) *Attorney, Agent, or Firm* — Tarolli, Sundheim, Covell & Tummino LLP

(57) ABSTRACT

Systems and methods are provided for monitoring a wellness of a user. A wellness-relevant parameter representing the user is monitored at a portable device over a defined period to produce a time series for the wellness-relevant parameter. A first set and a second set of either cognitive assessment data or psychosocial assessment data are obtained for the user at respective first and second times in the defined period. A value is assigned to the user via a predictive model according to the time series for the well- (Continued)

ness-relevant parameter, the first set of either cognitive assessment data or psychosocial assessment data, and the second set of either cognitive assessment data or psychosocial assessment data.

10 Claims, 11 Drawing Sheets

(51) Int. Cl.
    *A61B 5/16*     (2006.01)
    *G16H 50/20*     (2018.01)

(56) References Cited

U.S. PATENT DOCUMENTS

| | | |
|---|---|---|
| 2012/0264712 A1 | 10/2012 | Denny et al. |
| 2014/0163335 A1 | 6/2014 | Horseman |
| 2016/0022167 A1* | 1/2016 | Simon ................... A61B 5/381 |
| | | 600/301 |
| 2017/0308671 A1 | 10/2017 | Bahrami et al. |
| 2017/0347906 A1* | 12/2017 | Intrator ................. A61B 5/291 |
| 2019/0113973 A1 | 4/2019 | Coleman et al. |
| 2019/0239791 A1 | 8/2019 | Beck et al. |
| 2019/0307328 A1* | 10/2019 | Tran ..................... A61B 5/0077 |

OTHER PUBLICATIONS

First Office Action dated Feb. 16, 2024, pp. 1-4.
European Patent Office Search Report for corresponding application No. 21775464.7-1113, dated Mar. 18, 2024, pp. 1-7.

* cited by examiner

Daily AM

- Do you feel like you are getting sick (Y/N)
- Do you have Fever (Y/N)
- Do you have Cough (Y/N)
- Do you have Shortness of Breath (Y/N)
- In the last 24 hours:
  - Rate your intellectual wellness (Memory, Attention, Focus) (0-100)
  - Rate your physical wellness (Health, Strength) (0-100)
  - Rate your emotional wellness (Feelings, Outlook on Life) (0-100)
- Did you have a hard time falling asleep (0-100)
- Did you have a hard time getting out of bed (0-100)
- Do you feel rested from your sleep (0-100)
- Physical Performance Capability (e.g. strong, physically capable, energetic, full of power) (0-100)
- Mental Performance Capability (e.g. attentive, receptive, mentally alert, concentrated) (0-100)
- Emotional Balance (e.g. pleased, stable, in a good mood, having everything under control) (0-100)
- Overall Recovery (e.g. recovered, rested, muscled relaxation, physically relaxed) (0-100)
- Muscular Stress (e.g. muscle exhaustion, muscle fatigue, muscle soreness, muscle stiffness) (0-100)
- Lack of Activation (e.g. unmotivated, sluggish, unenthusiastic, lacking energy) (0-100)
- Negative Emotional State (e.g. feeling down, stressed, annoyed, short-tempered) (0-100)
- Overall Stress (e.g. tired, worn-out, overloaded, physically exhausted) (0-100)

FIG. 9

Daily PM

In the last 24 hours:
- Have you encounter anyone who is Positive with COVID-19 (Y/N)
- Have you encounter anyone who is being tested or concerned about having COVID-19 (Y/N)
- Have you encounter anyone who has flu symptoms. (Y/N)
- Number of people you interacted with at Work (i.e. Colleagues, patients, public areas) (#)
- Number of people you interacted with outside work (i.e. Family, friends, public settings) (#)
- How many times did you wash your hands (#)
- How many meals did you eat today (breakfast, lunch, dinner, snacks)?
- What type of food did you eat today
  - Pre-cooked foods
  - Fresh foods
  - Frozen foods
  - Canned foods
  - Other:
- Did you exercise today? (Y/N) How long (#)
- Do you take your time to rest and relax during that day?
- How Mentally demanding was your day
- How physically demanding was your day
- How hurried or rushed was the pace of your day
- How successful were you in the accomplishing your daily tasks
- How hard did you have to work on accomplish your level of performance
- How insecure discourage, irritated, stressed and annoyed were you today

FIG. 10

TYPICAL INFECTION/DISEASE BEFORE OUTBREAK

TYPICAL INFECTION/DISEASE OUTBREAK

PREDICTING WELLNESS OF A USER WITH MONITORING FROM PORTABLE MONITORING DEVICES

RELATED APPLICATIONS

This application is a U.S. National Stage Application filed under 35 USC 371, claiming priority to Serial No. PCT/US2021/024617, filed on 29 Mar. 2021; which claims priority from U.S. Provisional Patent Application Ser. No. 63/000,607, filed 27 Mar. 2020, and U.S. Provisional Patent Application Ser. No. 63/032,036, filed 29 May 2020, the entireties of which are hereby incorporated herein by reference.

TECHNICAL FIELD

This invention relates to a prediction of wellness of a user with monitoring from portable monitoring devices.

BACKGROUND OF THE INVENTION

Many disorders affecting the health and wellness of an individual can be difficult to detect in the early stages of the disorder, which is often the time in which intervention is most effective. For example, infectious diseases have incubation periods during which an individual can be contagious to others either without experiencing symptoms or while experiencing only relatively innocuous symptoms. Similarly, in many disorders, timely treatment can spare an individual the worst of the symptoms.

SUMMARY

In accordance with one aspect of the present invention, a method is provided for monitoring a wellness of a user. A wellness-relevant parameter representing the user is monitored at a portable device over a defined period to produce a time series for the wellness-relevant parameter. A first set and a second set of either cognitive assessment data or psychosocial assessment data are obtained for the user at respective first and second times in the defined period. A value is assigned to the user via a predictive model according to the time series for the wellness-relevant parameter, the first set of either cognitive assessment data or psychosocial assessment data, and the second set of either cognitive assessment data or psychosocial assessment data.

In accordance with another aspect of the present invention, a system includes a wearable device that monitors a wellness-relevant parameter representing a user over a defined period to produce a time series for the monitored parameter. A portable device receives a first set and a second set of either cognitive assessment data or psychosocial assessment data for the user at respective first and second times in the defined period. A predictive model assigns a value to the user according to the time series for the wellness-relevant parameter, the first set of either cognitive assessment data or psychosocial assessment data, and the second set of either cognitive assessment data or psychosocial assessment data.

In accordance with a further aspect of the present invention, a method is provided for monitoring a wellness of a user. A plurality of wellness-relevant parameters representing the user are monitored at a wearable device over a defined period to produce respective time series for the monitored parameter. A set of features representing the user are extracted from the time series for the plurality of wellness-relevant parameters. The set of features includes a predicted value for at least one of the plurality of wellness-relevant parameters. A value is assigned to the user via a predictive model according to the set of features.

BRIEF DESCRIPTION OF THE DRAWINGS

FIG. 9 illustrates example questions for a first survey that is completed in the morning for an example of the system used to predict the onset of symptoms from COVID-19;

FIG. 10 illustrates example questions for a second survey that is completed in the evening for the example of FIG. 9;

DETAILED DESCRIPTION

The term "wellness" as used herein in intended to refer to the mental, physical, cognitive, social, and emotional health of a user and should be construed to cover each of the health, function, balance, resilience, homeostasis, disease, and condition of the user. In various examples herein, the wellness of the user can relate to the readiness of the user to perform job-related functions, the susceptibility of the user to an infectious disease, the ability of the user to recover from an infectious disease, the exhibition of symptoms of an infectious disease by the user, the degree to which the user exhibits symptoms of an infectious disease, the ability to recover from an infectious disease, the effects of vaccines or other therapeutic substances on the user, including both efficacy and side effects, and the ability to avoid reinfection by a previously contracted infectious disease.

A "wellness-relevant parameter" is a physiological, cognitive, sensory (e.g., smell, taste, vision, sweat, hearing, etc.), psychosocial, or behavioral parameter that is relevant to the wellness of a user.

A "biological rhythm" is any chronobiological phenomenon that affects human beings, including but not limited to, circadian rhythms, ultradian rhythms, infradian rhythms, diurnal cycle, sleep/wake cycles, and patterns of life.

A "portable monitoring device," as used herein, refers to a device that is worn by, carried by, or implanted within a user that incorporates either or both of an input device and user interface for receiving input from the user and sensors for monitoring either a wellness-relevant parameter or a parameter that can be used to calculate or estimate a wellness-relevant parameter. Examples include wearables, such as smartwatches, rings, and similar devices, mobile devices, such as smartphones, and tablets, and laptop or notebook computers.

An "index", as used herein, is intended to cover composite statistics and AI findings derived from a series of observations and used as an indicator or measure. An index can be an ordinal, continuous, or categorical value representing the observations and correlations, and should be read to encompass statistics traditionally referred to as "scores" as well as the more technical meaning of index.

"Psychosocial assessment data" includes psychosocial, behavioral, and stress related parameters that can be used to assess the functionality and stress level of a user. Each of the parameters listed in Table 3 is an example of psychosocial assessment data.

"Cognitive assessment data" represents any of executive function, decision making, working memory, attention, and fatigue of a user as assessed by a one or more cognitive tests. Each of the parameters listed in Table 2 is an example of psychosocial assessment data.

Figure 1:
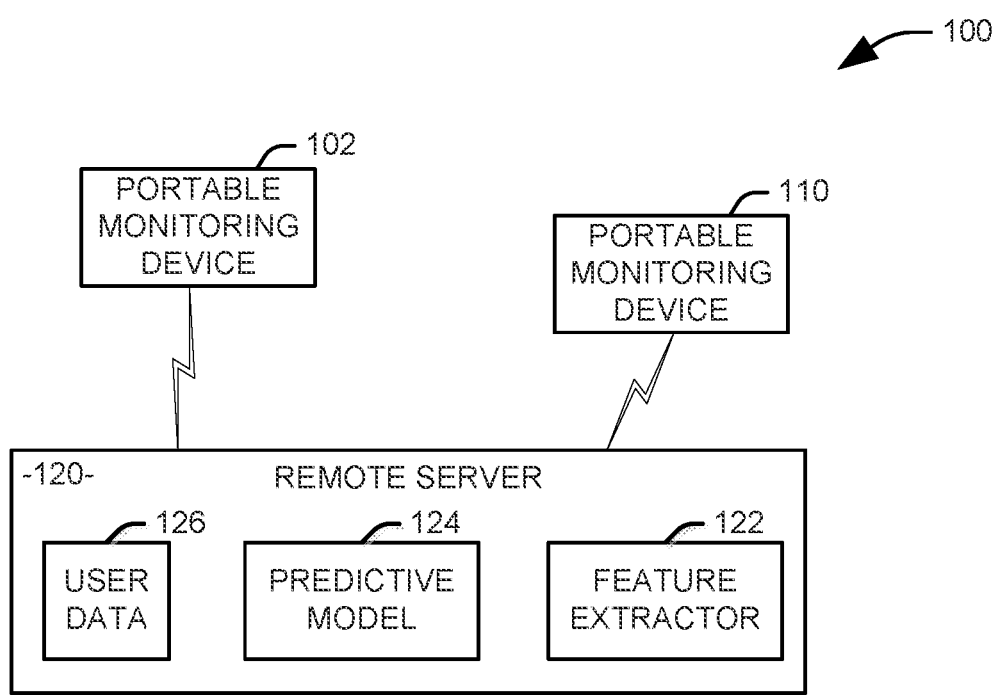
FIG. 1 illustrates a system for monitoring the wellness of a user in accordance with an aspect of the present invention.

FIG. 1 illustrates a system 100 for monitoring the health, wellness, and functional state of a user in accordance with an aspect of the present invention. The system 100 includes a plurality of portable monitoring devices 102 and 110 that includes sensors for monitoring systems tracking the wellness parameters for the user. It will be appreciated that a given portable monitoring device (e.g., 102) can either communicate directly with a remote server 120 to provide the wellness-relevant parameters to the server or with another portable monitoring device (e.g., 110) that relays the wellness-relevant parameters to the server. By using portable monitoring devices 102 and 110, measurements can be made continuous from any of a user's home, classroom, job, or sports field—literally anywhere from the battlefield to the board room—to effectively provide digital personal protective equipment for the user. As noted above, wellness-relevant parameters can include at least physiological, cognitive, psychosocial, sensory, and behavioral parameters. Table I provides non-limiting examples of physiological parameters that can be measured and exemplary tests, devices, and methods, to measure the physiological parameters.

TABLE I

| Physiological Parameter | Exemplary Devices and Methods to Measure Physiological Parameters |
|---|---|
| Brain Activity | Electroencephalogram, Magnetic Resonance Imaging, including functional Magnetic Resonance Imaging (fMRI), PET, SPECT, MEG, and other brain imaging modalities looking at electrical, blood flow, neurotransmitter, and metabolic function |
| Heart rate | Electrocardiogram and Photoplethysmogram |
| Heart rate variability | Electrocardiogram, Photoplethysmogram |
| Eye tracking | Pupillometry, including tracking saccades, fixations, and pupil size (e.g. dilation) |

TABLE I-continued

| Physiological Parameter | Exemplary Devices and Methods to Measure Physiological Parameters |
|---|---|
| Perspiration | Perspiration sensor |
| Blood pressure | Sphygmomanometer |
| Body temperature | Thermometer |
| Blood oxygen saturation and respiratory rate | Pulse oximeter/accelerometer |
| Skin conductivity | Electrodermal activity |
| Sympathetic and parasympathetic tone | Derived from the above measurements |
| Genetic biomarkers | Genetic testing |
| Immune biomarkers including TNF-alpha, immune alteration (e.g. ILs), oxidative stress, and hormones (e.g. cortisol) | Blood, saliva, and/or urine tests |

The physiological parameters can be measured via wearable or implantable devices as well as self-reporting by the user via applications in a mobile device, which facilitates measuring these physiological parameters in a naturalistic, non-clinical setting. For example, a smart watch can be used to measure the user's heart rate, heart rate variability, body temperature, blood oxygen saturation, movement, and sleep. These values can also be subject to a diurnal analysis to estimate variability and reviewed in view of expected changes due to biological rhythms, as well as deviations from an expected pattern of biological rhythms. For example, the biological rhythms of a user can be tracked for a predetermined period (e.g., ten days), to establish a normal pattern of biological rhythms. Oscillations in biological rhythms can be detected as departures from this established pattern.

The cognitive parameters can be assessed by a battery of cognitive tests that measure, for example, executive function, decision making, working memory, attention, and fatigue. Table II provides non-limiting examples of cognitive parameters that are gamified and that can be measured and exemplary methods and tests/tasks to measure such cognitive parameters.

TABLE II

| Cognitive Parameter | Exemplary Tests and Methods to Measure Cognitive Parameters |
|---|---|
| Temporal discounting | Kirby Delay Discounting Task |
| Alertness and fatigue | Psychomotor Vigilance Task |
| Focused attention and response inhibition | Erikson Flanker Task |
| Working memory | N-Back Task |
| Attentional bias towards emotional cues | Dot-Probe Task |
| Inflexible persistence | Wisconsin Card Sorting Task |
| Decision making | Iowa Gambling Task |
| Risk taking behavior | Balloon Analogue Risk Task |
| Inhibitory control | Anti-Saccade Task |
| Sustained attention | Sustained Attention |
| Executive function | Task Shifting or Set Shifting Task |

These cognitive tests can be administered in a clinical/laboratory setting or in a naturalistic, non-clinical setting such as when the user is at home, work or other non-clinical setting. A smart device, such as a smartphone, tablet, or smart watch, can facilitate measuring these cognitive parameters in a naturalistic, non-clinical setting. For example, the Erikson Flanker, N-Back and Psychomotor Vigilance Tasks can be taken via an application on a smart phone, tablet, or smart watch.

Table III provides non-limiting examples of psychosocial, behavioral, and stress related parameters that can be measured and exemplary tests, devices, and methods, to measure the behavioral parameters.

TABLE III

| Psychosocial or Behavioral Parameter | Exemplary Tests and Methods to Measure Psychosocial or Behavioral Parameters |
|---|---|
| Symptom log | Presence of specific symptoms (i.e. fever, headache, cough, loss of smell) |
| Burnout | Burnout inventory or similar |
| Physical, Mental, and Social Health | User-Reported Outcomes Measurement Information System (PROMIS) |
| Depression | Hamilton Depression Rating Scale |
| Anxiety | Hamilton Anxiety Rating Scale |
| Mania | Snaith-Hamilton Pleasure Scale |
| Mood/Catastrophizing scale | Profile of Mood States; Positive Affect Negative Affect Schedule |
| Affect | Positive Affect Negative Affect Schedule |
| Impulsivity | Barratt Impulsiveness Scale |
| Anhedonia | Snaith-Hamilton Pleasure Scale |
| Sleep | Sleep onset & offset, sleep quality, sleep quantity, from wearable accelerometer and PPG |
| Activity level | Daily movement total, time of activities, from wearable accelerometer, steps |
| Adverse Childhood Experiences | Childhood trauma |
| Daily Activities | Exposure, risk taking |
| Daily Workload and Stress | NASA Task Load Index, Perceived Stress Scale (PSS), Social Readjustment Rating Scale (SRRS) |
| Social Determents of Health | Social determents of health questionnaire |

The behavioral and psychosocial parameters can measure the user's functionality, such as the user's movement via wearable devices as well as subjective/self-reporting questionnaires. These parameters can also be used to quantify an overall stress level of the user that is updated at regular intervals. The subjective/self-reporting questionnaires can be collected in a clinical/laboratory setting or in a naturalistic, in the wild, non-clinical setting such as when the user is at home, work, or other non-clinical setting. A smart device, such as a smartphone, tablet, or personal computer can be used to administer the subjective/self-reporting questionnaires. Using embedded accelerometers and cameras, these smart devices can also be used to capture the user's movements as well as facial expression analysis to analyze the user's facial expressions that could indicate mood, anxiety, depression, agitation, and fatigue.

In addition to one or more combinations of physiological, cognitive, psychosocial, and behavioral parameters, clinical data can also be part of the multi-dimensional feedback approach to predicting wellness. Such clinical data can includes, for example, the user's clinical state, the user's medical history (including family history), employment information, and residential status.

The remote server that analyzes the data collected by the portable monitoring devices 102 and 110. The remote server 120 can be implemented as a dedicated physical server or as part of a cloud server arrangement. In addition to the remote server, data can be analyzed on the local device itself and/or in a federated learning mechanism. Information received from the portable monitoring devices 102 and 110 is provided to a feature extractor 122 that extracts a plurality of features for use at a predictive model 124. The feature extractor 122 determines categorical and continuous parameters representing the wellness-relevant parameters. In one example, the parameters can include descriptive statistics, such as measures of central tendency (e.g., median, mode, arithmetic mean, or geometric mean) and measures of deviation (e.g., range, interquartile range, variance, standard deviation, etc.) of time series of the monitored parameters, as well as the time series themselves. In one implementation, the feature extractor 124 can perform a wavelet transform on the time series of values for one or more parameters to provide a set of wavelet coefficients. It will be appreciated that the wavelet transform used herein is two-dimensional, such that the coefficients can be envisioned as a two-dimensional array across time and either frequency or scale.

For a given time series of parameters, $x_i$, the wavelet coefficients, $W_a(n)$, produced in a wavelet decomposition can be defined as:

$$W_a(n) = a^{-1} \sum_{i=1}^{M} x_i \psi\left(\frac{i-n}{a}\right) \qquad \text{Eq. 3}$$

wherein $\psi$ is the wavelet function, M is the length of the time series, and a and n define the coefficient computation locations.

It will be appreciated that the wavelet coefficients can be used as individual features as well as aggregated to make composite features. In one example, a center of the mass, represented as an ordered pair of time and either frequency or scale, can be used to provide features at the predictive model 124. Alternatively, one or more weighted combination of wavelet coefficients can be used as features, with the weights for each combination determined during a training process of the predictive model.

Additionally or alternatively, the wellness-relevant parameters can be used to assign a plurality of categorical parameters to the user according to thresholds for wellness-relevant parameters or rule sets that act upon time series of values for the wellness-relevant parameters, for example, representing the presence or absence of a given condition or behavior. The predictive model 124 can also utilize user data 126 stored at the remote server 120, including, for example, employment information (e.g., title, department, shift), age, sex, home zip code, genomic data, nutritional information, medication intake, household information (e.g., type of home, number and age of residents), social and psychosocial, consumer spending and profiles, financial, food safety, physical abuse, and relevant medical history. In addition the model can combine multiple users to interact together to refine prediction such as social model of spouse, children, family, co-workers, friends and others.

The predictive model 124 can utilize one or more pattern recognition algorithms, each of which analyze the extracted features or a subset of the extracted features to assign a continuous or categorical parameter to the user. In one example, the assigned parameter can represent a predicted "burnout" of the user, that is, a predicted decrease in cognitive function, due to stress, fatigue, or illness, to an extent that will materially affect job performance. In this example, sleep and activity data can be used along with results from a cognitive assessment and mood reporting applications to provide a continuous index representing the degree of burnout experienced by the user. It will be appreciated, however, that additional or alternative features can be used in the analysis and that the index can be replaced with a categorical classification (e.g., "near baseline", "reduced", "impaired") in some implementations, for example, by applying one or more decision thresholds to the index.

In another example, the predictive model 124 can be used to provide an index representing an internal marker of brain body balance, homeostasis, resilience, and wellness. In yet another example, the predictive model 124 can be used to provide an index representing a measure of homeostasis for the user or to predict levels of the autonomic nervous system tone, as well as certain biomarkers representing various body organs, the eye, the cardiovascular system, the gastrointestinal tract, GU, Immune and endocrine systems, including glucose, C-reactive protein, and IL-6. In still another example, the predictive model 124 can predict a present or future pathogen (e.g., virus, bacteria, fungus, prion) concentration in a given tissue or bodily fluid of a patient. In another example, the predictive model 124 wherein the value represents can represent an expected degree of immunity provided to the user by immunization. For example, the output of predictive model can represent an expected concentration of antibodies associated with a given vaccine in the blood of the user after a predetermined period following the immunization.

In a still further example, the wellness-relevant data can be used to provide a continuous index representing the risk posed to the user by a specific illness or class of illnesses (e.g., immune disorders, cytokine storm, cancers, and infectious diseases). For example, the index can represent a risk of infection, risk of being contagious, expressed, for example, as a predicted time for the individual to become contagious or a predicted virus PCR (polymerase chain reaction) levels in the nasopharynx and mouth and saliva, or a blood test, a predicted time to an onset of symptoms, a probability of recovery from a potential infection, or a single value representing a blend of two or more of these factors. Immune disorders include autoimmune disorders, hypersensitivity syndromes, immune deficiency disorders, and combinations thereof. Such immune disorders can be caused by cell-mediated immunity (T lymphocytes), humoral immunity (B lymphocytes) and immune tolerance. Immune disorders may result in destruction of body tissue, abnormal growth of an organ, and/or changes in organ function. An immune disorder may affect one or more organ or tissue types.

An autoimmune disorder is a type of immune disorder resulting from an abnormal or exaggerated adaptive immune response that targets healthy cells or tissues that should not normally cause an immune reaction in the body. Autoimmune disorders include disorders in line with Witebsky's Postulates. These disorders can include multiple sclerosis, ankylosing spondylitis, rheumatoid arthritis, celiac disease, myositis, myasthenia gravis, Addison's disease, lupus, hemolytic anemia, vitiligo, scleroderma, psoriasis, Hashimoto's disease, Addison's disease, Grave's disease, reactive arthritis, Sjogren's syndrome, nephritis, chronic Lyme disease, vasculitis, endocarditis, alopecia areata, urticaria, vasculitis, uveitis, pemphigus, Fibromyalgia, thrombophelebitis, erythema nodusum, dermatitis, eczema, Type 1 Diabetes, temporal arteritis, Crohn's Disease, Behcet's disease, or psoriatic arthritis.

Hypersensitivity syndromes include immediate (Type I) hypersensitivity, antibody-mediated (Type II) hypersensitivity, immune complex-medicated (Type III) hypersensitivity, and cell-mediated (Type IV) hypersensitivity. Non-limiting examples of Type I hypersensitivity disorders are chronic or acute allergies, atopic forms of bronchial asthma, and anaphylaxis. Non-limiting examples of Type II hypersensitivity syndromes are autoimmune hemolytic anemia, autoimmune thrombocytopenic purpura, pemphigus vulgaris, vasculitis caused by antineutrophil cytoplasmic antibodies, Goodpasture syndrome, acute rheumatic fever, myasthenia gravis, Graves' disease, insulin-resistant diabetes, and pernicious anemia. Type II hypersensitivity syndromes may be caused by the production of antibodies that bind to non-self antibodies, such as after an allogenic transplantation resulting in organ rejection; blood-group incomparability resulting in hemolysis; antibodies that bind to tumor-associated antigens resulting in paraneoplastic syndromes, neuropathies, and channelopathies, for example. Type II hypersensitivity may also be caused by antibodies directed against cell-membrane bound medications resulting in medication-induced cell death, such as heparin-induced thrombocytopenia, for example. Non-limiting examples of Type III hypersensitivity disorders are systemic lupus erythematosus, poststreptococcal glomerulonephritis, acute glomerulonephritis, serum sickness, Arthus reaction, reactive arthritis, and polyarteritis nodosa. Non-limiting examples of Type IV hypersensitivity syndromes are contact dermatitis, multiple sclerosis, type 1 diabetes, transplant rejection, rheumatoid arthritis, tuberculosis, and peripheral neuropathy.

Immune deficiency disorders include primary immunodeficiency disorders and secondary immunodeficiency disorders. Non-limiting examples of primary immunodeficiency disorders are X-linked agammaglobulinemia, common variable immunodeficiency, isolated IgA deficiency, hyper-IgM syndrome, DiGeorge syndrome, severe combined immunodeficiency disease (SCID), Wiskott-Aldrich syndrome, and genetic deficiencies of the complement system. Non-limiting examples of secondary immunodeficiency disorders are Acquired Immunodeficiency Syndrome (AIDS), human immunodeficiency virus (HIV) infection, combined immune deficiency syndrome (CIDS), and a spinal cord injury-induced immune depression syndrome (SCIIDS).

Non-limited examples of infectious disease include *Acinetobacter* infections, Actinomycosis, African sleeping sickness (African trypanosomiasis), AIDS (acquired immunodeficiency syndrome), Amoebiasis, Anaplasmosis, Angiostrongyliasis, Anisakiasis, Anthrax, *Arcanobacterium haemolyticum* infection, Argentine hemorrhagic fever, Ascariasis, Aspergillosis, Astrovirus infection, Babesiosis, *Bacillus cereus* infection, Bacterial meningitis, Bacterial pneumonia, Bacterial vaginosis, *Bacteroides* infection, Balantidiasis, Bartonellosis, *Baylisascaris*, infection, BK virus infection, Black piedra, Blastocystosis, Blastomycosis, Bolivian hemorrhagic fever, Botulism (and Infant botulism), Brazilian hemorrhagic fever, Brucellosis, Bubonic plague, *Burkholderia* infection, Buruli ulcer, Calicivirus infection (Norovirus and Sapovirus), Campylobacteriosis, Candidiasis (Moniliasis; Thrush), Capillariasis, Carrion's disease, Cat-scratch disease, Cellulitis, Chagas disease (American trypanosomiasis), Chancroid, Chickenpox, Chikungunya, *Chlamydia, Chlamydophila pneumoniae* infection (Taiwan acute respiratory agent or TWAR), Cholera, Chromoblastomycosis, Chytridiomycosis, Clonorchiasis, *Clostridium difficile*, colitis, Coccidioidomycosis, Colorado tick fever (CTF), Common cold (Acute viral rhinopharyngitis; Acute coryza), Coronavirus disease 2019, Creutzfeldt-Jakob disease (CJD), Crimean-Congo hemorrhagic fever (CCHF), Cryptococcosis, Cryptosporidiosis, Cutaneous larva migrans (CLM), Cyclosporiasis, Cysticercosis, Cytomegalovirus infection, Dengue fever, Desmodesmus infection, Dientamoebiasis, Diphtheria, Diphyllobothriasis, Dracunculiasis, Ebola hemorrhagic fever, Echinococcosis, Ehrlichiosis, Enterobiasis (Pinworm infection), *Enterococcus* infection, Enterovirus infection, Epidemic typhus, Erythema infectiosum (Fifth disease), Exanthem subitum (Sixth disease), Fasciolasis, Fasciolpsiasis, Fatal familial insomnia (FFI), Filariasis, Food poisoning by *Clostridium perfringens*, Free-living amebic infection, *Fusobacterium* infection, Gas gangrene (Clostridial myonecrosis), Geotrichosis, Gerstmann-Strussler-Scheinker syndrome (GSS), Giardiasis, Glanders, Gnathostomiasis, Gonorrhea, Granuloma inguinale (Donovanosis), Group A streptococcal infection, Group B streptococcal infection, *Haemophilus influenzae* infection, "Hand, foot and mouth disease (HFMD)", Hantavirus Pulmonary Syndrome (HPS), Heartland virus disease, *Helicobacter pylori* infection, Hemolytic-uremic syndrome (HUS), Hemorrhagic fever with renal syndrome (HFRS), Hendra virus infection, Hepatitis A, Hepatitis B, Hepatitis C, Hepatitis D, Hepatitis E, Herpes simplex, Histoplasmosis, Hookworm infection, Human bocavirus infection, Human *ewingii* ehrlichiosis, Human granulocytic anaplasmosis (HGA), Human metapneumovirus infection, Human monocytic ehrlichiosis, Human papillomavirus (HPV) infection, Human parainfluenza virus infection, Hymenolepiasis, Epstein-Barr virus infectious mononucleosis (Mono), Influenza (flu), Isosporiasis, Kawasaki disease, Keratitis, Kingella kingae infection, Kuru, Lassa fever, Legionellosis (Legionnaires' disease), Pontiac fever, Leishmaniasis, Leprosy, Leptospirosis, Listeriosis, Lyme disease (Lyme borreliosis), Lymphatic filariasis (Elephantiasis), Lymphocytic choriomeningitis, Malaria, Marburg hemorrhagic fever (MHF), Measles, Middle East respiratory syndrome (MERS), Melioidosis (Whitmore's disease), Meningitis, Meningococcal disease, Metagonimiasis, Microsporidiosis, Molluscum contagiosum (MC), Monkeypox, Mumps, Murine typhus (Endemic typhus), *Mycoplasma* pneumonia, *Mycoplasma genitalium* infection, Mycetoma, Myiasis, Neonatal conjunctivitis (Ophthalmia neonatorum), Nipah virus infection, Norovirus (children and babies), "(New) Variant Creutzfeldt-Jakob disease (vCJD, nvCJD)", Nocardiosis, Onchocerciasis (River blindness), Opisthorchiasis, Paracoccidioidomycosis (South American blastomycosis), Paragonimiasis, Pasteurellosis, Pediculosis capitis (Head lice), Pediculosis corporis (Body lice), "Pediculosis pubis (pubic lice, crab lice)", Pelvic inflammatory disease (PID), Pertussis (whooping cough), Plague, Pneumococcal infection, *Pneumocystis* pneumonia (PCP), Pneumonia, Poliomyelitis, *Prevotella* infection, Primary amoebic meningoencephalitis (PAM), Progressive multifocal leukoencephalopathy, Psittacosis, Q fever, Rabies, Relapsing fever, Respiratory syncytial virus infection, Rhinosporidiosis, Rhinovirus infection, Rickettsial infection, Rickettsialpox, Rift Valley fever (RVF), Rocky Mountain spotted fever (RMSF), Rotavirus infection, Rubella, *Salmonellosis*, SARS (severe acute respiratory syndrome), Scabies, Scarlet fever, Schistosomiasis, Sepsis, Shigellosis (bacillary dysentery), Shingles (Herpes zoster), Smallpox (variola), Sporotrichosis, Staphylococcal food poisoning, Staphylococcal infection, Strongyloidiasis, Subacute sclerosing panencephalitis, Bejel, Syphilis, Yaws, Taeniasis, Tetanus (lockjaw), *Tinea barbae* (barber's itch), *Tinea capitis* (ringworm of the scalp), *Tinea corporis* (ringworm of the body), *Tinea cruris* (Jock itch), *Tinea manum* (ringworm of the hand), *Tinea nigra, Tinea pedis* (athlete's foot), *Tinea unguium* (onychomycosis), *Tinea versicolor* (*Pityriasis versicolor*), Toxocariasis (ocular larva migrans (OLM)), Toxocariasis (visceral larva migrans (VLM)), Toxoplasmosis, Trachoma, Trichinosis, Trichomoniasis, Trichuriasis (whipworm infection), Tuberculosis, Tularemia, Typhoid fever, Typhus fever, *Ureaplasma urealyticum* infection, Valley fever, Venezuelan equine encephalitis, Venezuelan hemorrhagic fever, *Vibrio vulnificus* infection, *Vibrio parahaemolyticus* enteritis, Viral pneumonia, West Nile fever, White piedra (*tinea blanca*), *Yersinia pseudotuberculosis* infection, Yersiniosis, Yellow fever, Zeaspora, Zika fever, Zygomycosis.

Where multiple classification or regression models are used, an arbitration element can be utilized to provide a coherent result from the plurality of models. The training process of a given classifier will vary with its implementation, but training generally involves a statistical aggregation of training data into one or more parameters associated with the output class. The training process can be accomplished on a remote system and/or on the local device or wearable, app. The training process can be achieved in a federated or non-federated fashion. For rule-based models, such as decision trees, domain knowledge, for example, as provided by one or more human experts, can be used in place of or to supplement training data in selecting rules for classifying a user using the extracted features. Any of a variety of techniques can be utilized for the classification algorithm, including support vector machines, regression models, self-organized maps, fuzzy logic systems, data fusion processes, boosting and bagging methods, rule-based systems, or artificial neural networks.

Federated learning (aka collaborative learning) is a machine learning technique that trains an algorithm across multiple decentralized edge devices or servers holding local data samples, without exchanging their data samples. This approach stands in contrast to traditional centralized machine learning techniques where all data samples are uploaded to one server, as well as to more classical decentralized approaches which assume that local data samples are identically distributed. Federated learning enables multiple actors to build a common, robust machine learning model without sharing data, thus addressing critical issues such as data privacy, data security, data access rights, and access to heterogeneous data. Its applications are spread over a number of industries including defense, telecommunications, IoT, or pharmaceutics.

For example, an SVM classifier can utilize a plurality of functions, referred to as hyperplanes, to conceptually divide boundaries in the N-dimensional feature space, where each of the N dimensions represents one associated feature of the feature vector. The boundaries define a range of feature values associated with each class. Accordingly, an output class and an associated confidence value can be determined for a given input feature vector according to its position in feature space relative to the boundaries. In one implementation, the SVM can be implemented via a kernel method using a linear or non-linear kernel.

An ANN classifier comprises a plurality of nodes having a plurality of interconnections. The values from the feature vector are provided to a plurality of input nodes. The input nodes each provide these input values to layers of one or more intermediate nodes. A given intermediate node receives one or more output values from previous nodes. The received values are weighted according to a series of weights established during the training of the classifier. An intermediate node translates its received values into a single output according to a transfer function at the node. For example, the intermediate node can sum the received values and subject the sum to a binary step function. A final layer of nodes provides the confidence values for the output classes of the ANN, with each node having an associated value representing a confidence for one of the associated output classes of the classifier.

Many ANN classifiers are fully-connected and feedforward. A convolutional neural network, however, includes convolutional layers in which nodes from a previous layer are only connected to a subset of the nodes in the convolutional layer. Recurrent neural networks are a class of neural networks in which connections between nodes form a directed graph along a temporal sequence. Unlike a feedforward network, recurrent neural networks can incorporate feedback from states caused by earlier inputs, such that an output of the recurrent neural network for a given input can be a function of not only the input but one or more previous inputs. As an example, Long Short-Term Memory (LSTM) networks are a modified version of recurrent neural networks, which makes it easier to remember past data in memory.

A rule-based classifier applies a set of logical rules to the extracted features to select an output class. Generally, the rules are applied in order, with the logical result at each step influencing the analysis at later steps. The specific rules and their sequence can be determined from any or all of training data, analogical reasoning from previous cases, or existing domain knowledge. One example of a rule-based classifier is a decision tree algorithm, in which the values of features in a feature set are compared to corresponding threshold in a hierarchical tree structure to select a class for the feature vector. A random forest classifier is a modification of the decision tree algorithm using a bootstrap aggregating, or "bagging" approach. In this approach, multiple decision trees are trained on random samples of the training set, and an average (e.g., mean, median, or mode) result across the plurality of decision trees is returned. For a classification task, the result from each tree would be categorical, and thus a modal outcome can be used.

In one implementation, the predictive model 124 can include a constituent model that predicts future values for wellness-relevant parameters, such as a convolutional neural network that is provided with one or more two-dimensional arrays of wavelet transform coefficients as an input. The wavelet coefficients detect not only changes in time, but also in temporal patterns, and can thus reflect changes in the ordinary biological rhythms of the user. In one implementation, the wellness-relevant parameters predicted by the constituent models can include measured parameters such as heart rate, temperature, and heart rate variability as well as symptoms such as headaches, fatigue, shortness of breath, coughing, and sleep disruption. It will be appreciated that a given constituent model can use data in addition to the wavelet coefficients, such as other measured features and user data 126 to provide these predictions.

The output of the predictive model 124 can be a categorical parameter representing a status of the user, such as "infected" or "not infected", "contagious" or "not contagious", or "recovered" or "not recovered." In one example, used for screening secured areas for individuals who may be contagious, for example, airport security and medical admissions, the categorical parameter can represent whether an individual can be admitted immediately, denied admission, or subjected to further screening. A categorical parameter can also represent ranges of likelihoods for a current or predicted status. In another implementation, the output of the predictive model 124 can be a continuous parameter, such as a likelihood of a predicted or current status. In one example, the predictive model 124 can include one or more constituent models that predict a value for a wellness-relevant parameter at a future time. For example, a given model can predict a heart rate or temperature for a user at a future time (e.g., in three days) based on received data from the feature extractor 122 and stored user data 126. These predicted values can be provided to a user or utilized as inputs to additional models to predict a status of the user at the future time. In one example, the predictive model 124 includes a plurality of convolutional neural networks, each configured to predict a future value for a wellness-relevant parameter, with the predicted values from the plurality of convolutional neural networks used to predict a future status of the user.

In some implementations, the predictive model 124 can include a feedback component 128 can tune various parameters of the predictive model 124 based upon the accuracy of predictions made by the model. In one example, the feedback component 128 can be shared by a plurality of predictive models 124, with the outcomes for users associated with each predictive model compared to the outcomes predicted by the output of the model. Parameters associated with the model, such as thresholds for producing categorical inputs or outputs from continuous values, can be adjusted according to the differences in the actual and predicted outcomes. In one example, a continuous output of the system can be compared to a threshold value to determine if the patient is infectious or non-infectious. This threshold can be varied by the feedback model 128 to increase the accuracy of the determination.

Alternatively, the predictive model 124 can obtain feedback at the level of the individual model. For example, in a predictive model 124 using constituent models to predict future values of wellness-relevant parameters, the model receives consistent feedback as to the accuracy of these predictions once the wellness-relevant parameter is measured. This feedback can be used to adjust parameters of the model, including individualized thresholds for that user to produce categorical inputs or outputs from continuous values, or baseline values for biological rhythms associated with the patient. Alternatively, feedback can be provided from a final output of the model and compared to other data, such as a user-reported status (e.g., symptomatic or asymptomatic for a given condition), to provide feedback to the model. In one implementation, a reinforcement learning approach can be used to adjust the model parameters based on the accuracy of either predicted future values of wellness-relevant parameters at intermediate stages of the predictive model 124 or the output of the predictive model. For example, a decision threshold used to generate a categorical output from a continuous index produced by the predictive model 124 can be set at an initial value based on feedback from a plurality of models from previous users and adjusted via the reinforcement model to generate a decision threshold specific to the user.

Figure 2:
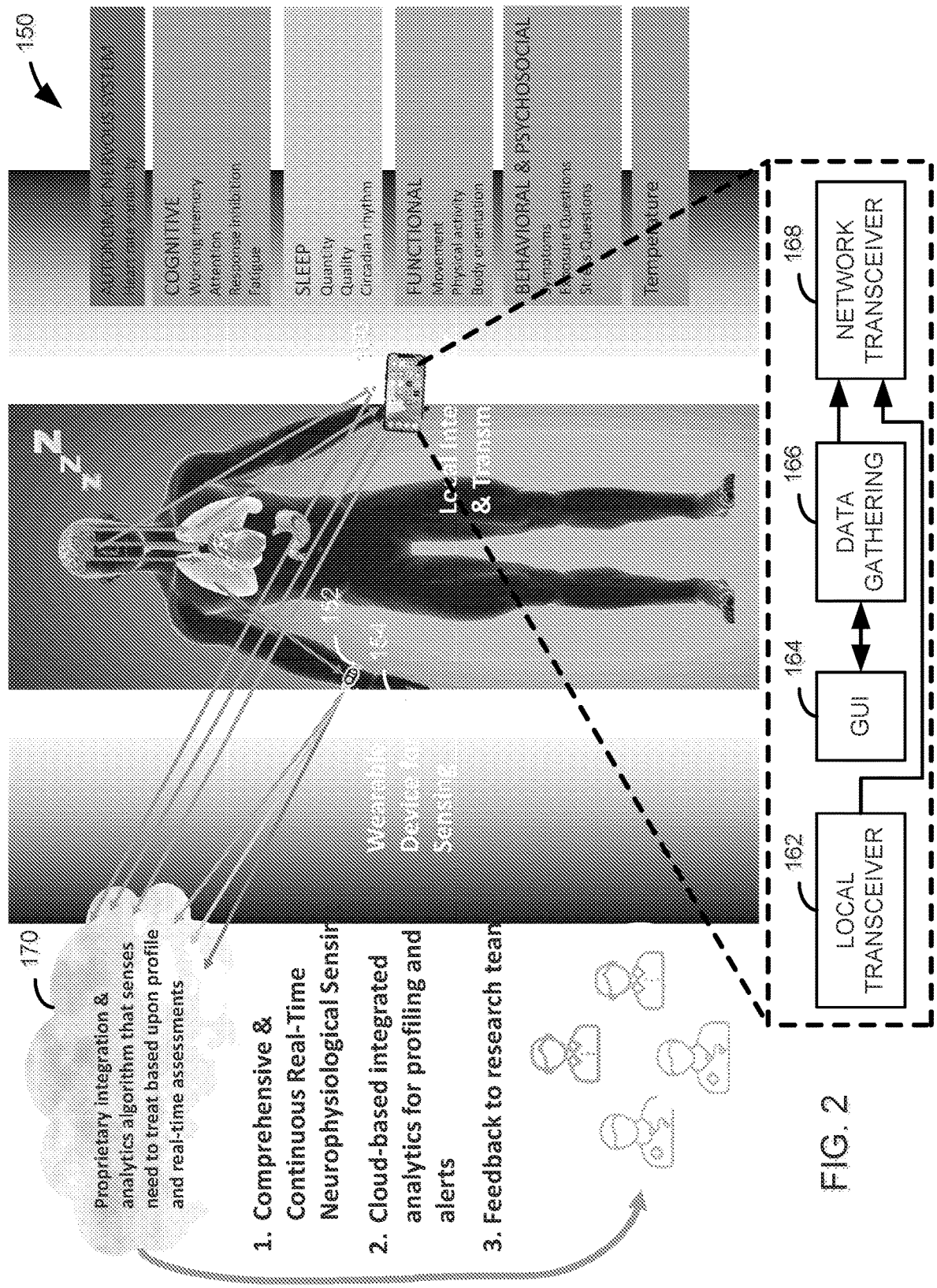
FIG. 2 is a schematic example of the system of FIG. 1 using a plurality of portable monitoring devices.
Figure 3:
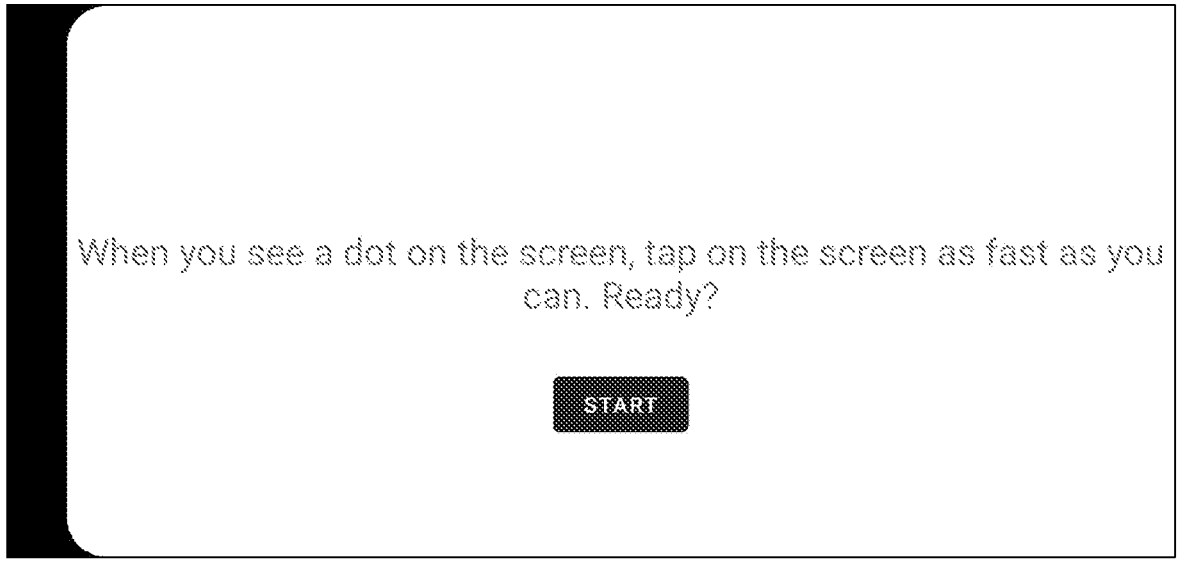
FIG. 3 is a screenshot of a reaction time test from an example cognitive assessment application.
Figure 4:
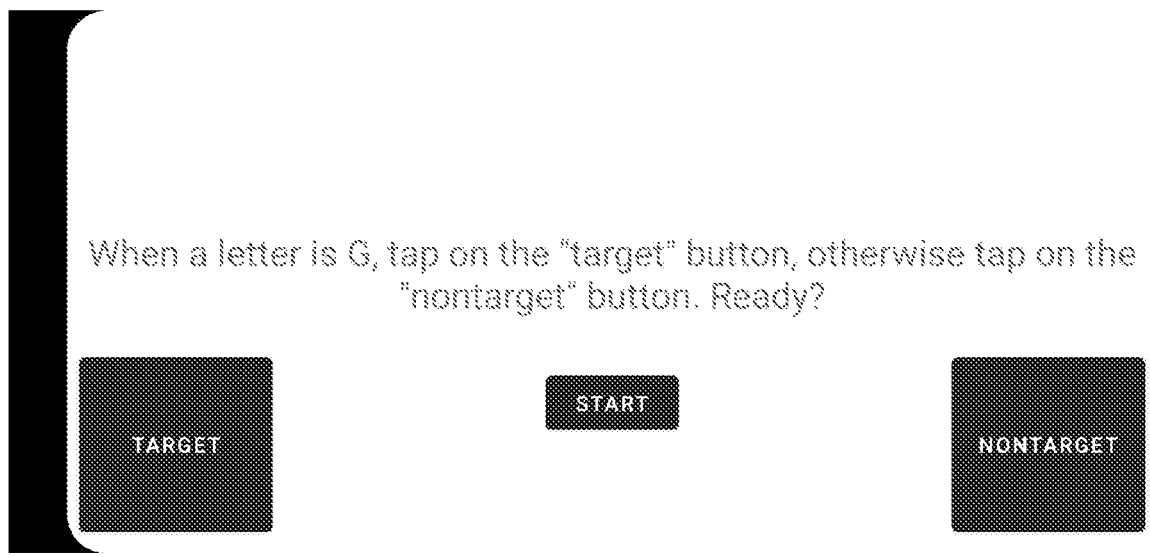
FIG. 4 is a screenshot of an attention test from an example cognitive assessment application.
Figure 5:
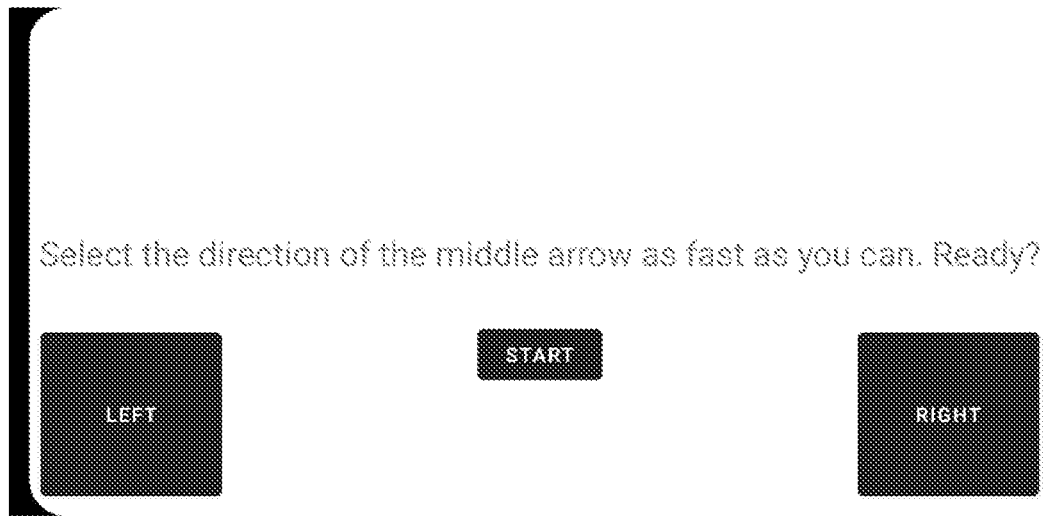
FIGS. 5 and 6 are screenshots of a response inhibition test from an example cognitive assessment application.
Figure 6:
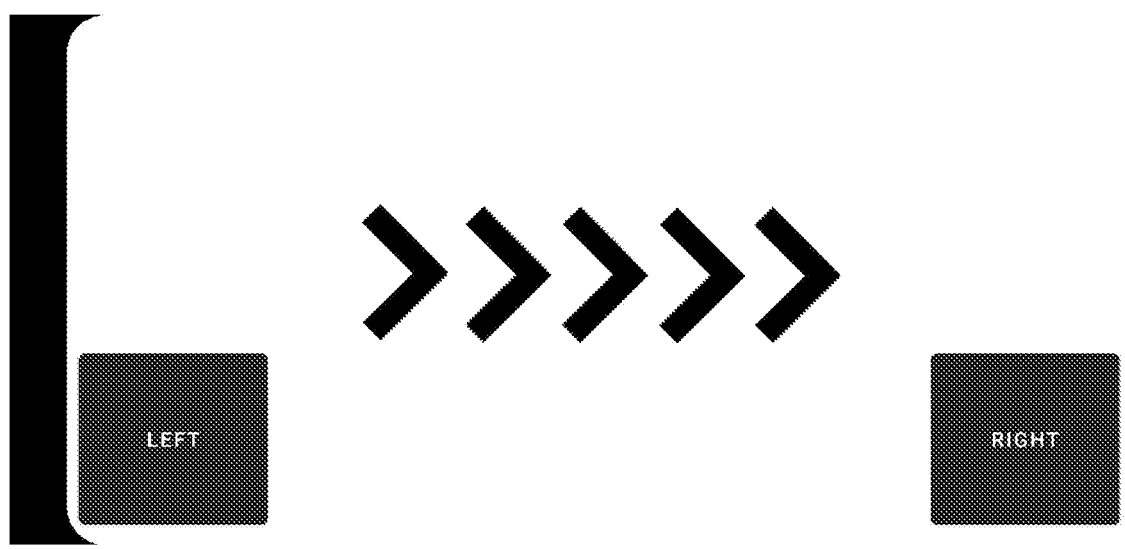
Figure 7:
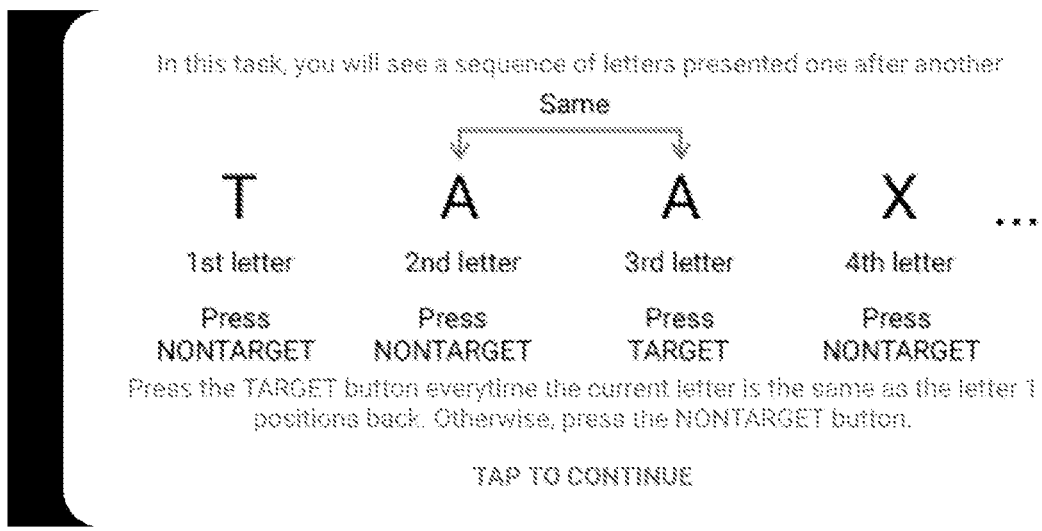
FIG. 7 is a screenshot of a working memory (1-back) test from an example cognitive assessment application.
Figure 8:
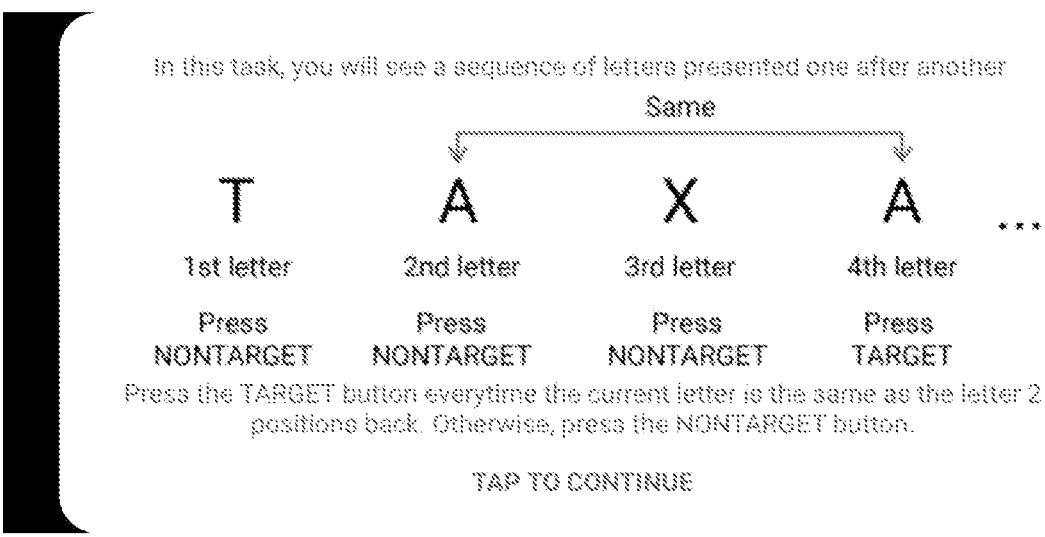
FIG. 8 is a screenshot of a working memory (2-back) test from an example cognitive assessment application.

FIG. 2 is a schematic example 150 of the system of FIG. 1 using a plurality of portable monitoring devices 152, 154, and 160. In the illustrated implementation, the first and second portable monitoring devices 152 and 154 are wearable devices, worn on the wrist and finger, respectively. Wellness-relevant parameters monitored by the first and second portable monitoring devices 152 and 154 can include, for example, heart rate, heart rate variability, metrics of sleep quality, biological rhythm variations, metrics of sleep quantity, physical activity of the user, body orientation, movement, arterial blood pressure, respiratory rate, peripheral arterial oxyhemoglobin saturation, as measured by pulse oximetry, maximum oxygen consumption, temperature, and temperature variation. Wearable devices, as used herein, can include any wearable items implemented with appropriate sensors, including watches, wristbands, rings, headbands, and other wearable items that can maintain sensors in an appropriate position for monitoring the wellness-relevant parameters. It will be appreciated that a given wearable device 152 and 154 can monitor many of these parameters with great frequency (e.g., every five minutes) allowing for a detailed time series of data to be generated.

The system 150 can further include a mobile device 160 that communicates with the first and second portable monitoring devices 152 and 154 via a local transceiver 162. The mobile device 160 can also include a graphical user interface 164 that allows a user to interact with one or more data gathering applications 166 stored at the base unit. One example of a possible data gathering applications can include a cognitive assessment application that tests various measures of cognitive function. These can include working memory, attention, and response inhibition, fatigue, cognition. Further, these metrics can be compared to an established baseline to estimate a measure of fatigue for the user. Screenshots from an example cognitive assessment application are provided as FIGS. 3-8. Another data gathering application can include a questionnaire application that allows the user to self-report symptoms, mood, mental, physical, and emotional states, and stress. FIG. 9 illustrates example questions for a first survey that is completed in the morning for an example of the system used to predict the onset of symptoms from COVID-19. FIG. 10 illustrates example questions for a second survey that is completed in the evening for this example. In general, the data gathering applications 166 can be selected and configured to monitor each of:

1. Attention, alertness, Fatigue-Neuropsychologist—measurements of mental overload, decision making, concentration, distraction, inhibitory control, Flanker task, Reaction time, # of times and lapses in hitting a light, choice reaction task and others with attentional components, distractibility, focus, continuous recognition, stroop
2. Memory—SAGE-Self-administered gerocognitive examination, declarative memory
3. Language—
4. Mood and Emotions—CES-D, depression and mood profiles
5. Reward and risk taking—delayed discounting, reward learning,
6. Perceptual processing—visual, auditory, olfactory, somatosensory/multimodal
7. Fatigue— psychomotor vigilance task and other attentional tasks
8. Sensory—systems such as smell, taste, vision, hearing, touch
9. Motor
10. Neural Capacity
11. Social Systems
12. Social network The mobile device 160 further comprises a network transceiver 168 via which the system 150 communicates with a remote server 170 via a local area network or Internet connection. In this example, the remote server 170 includes a predictive model implemented as a recurrent neural network, specifically a network with a long short-term memory architecture. In this example, wellness-relevant parameters from the wearable devices 152 and 154, such as temperature, in combination with questionnaire responses and cognitive assessment, can be provided to the predictive model as time series along with other relevant data. An output of the model is an index representing risk posed to the user by COVID-19.

It will be appreciated that data can be collected from a plurality of users who may be socially connected, for example, as family, coworkers, or friends. An example is the concept of "herd immunity" computed as a social context around an individual. Social connections between users can be self-reported or derived from self-reported data, or, in one example, determined through analysis of location history from the mobile devices of monitored users. The use of location data or proximity sensors, which detect portable monitoring devices associated with other users within a threshold distance, might allow for instances of frequent spatial proximity that are not deliberate social contact (e.g., sharing a common vehicle for public transportation.) In one example, Bluetooth or similar short-range communication between mobile devices carried by users can be used to determine that users have been spatially proximate. An index indicating susceptibility or contraction to an infectious disease could be used as part of a predictor for other, connected individuals. This data could also be used to predict locations at which a disease might spread, allowing for an artificial intelligence driven smart social distancing. It will be appreciated that information gathered from users will be stored in encrypted form and shared only after removal of personally identifying data to preserve users' privacy.

In one example, a high traffic location, such as a retail store, an airport, college campus, school, or hospital, could have a number of Bluetooth beacons at known locations. As users pass the beacons, the Bluetooth transceiver in their mobile device will interact with the beacon, with an identifier for the user and a time stored for each interaction. These values, as well as other location and proximity information collected by the application, can be employed for contact tracing as well as for determining the risk of infection associated with various locations. A similar process can be performed using geolocation data collected by a GPS receiver, with users passing through a geofenced region associated with a given location recorded or the presence of infected or contagious users passing through a dynamic geofence associated with each device recorded.

Location data from user devices and/or designed Bluetooth beacons can be used to generate a mapping of infection risk across a region of interest. In one example, the presence of user who reports symptoms associated with a given infectious disease via one of the data gathering applications 166 can be assigned to a given location. In another example, both users with reported symptoms and users who are predicted to be contagious from the predictive model 124 can be used to generate the risk score. In one implementation, the contribution to the risk score for users who are predicted to be contagious can be weighted according to a probability or confidence value associated with the prediction of contagiousness.

The map can be adjusted to show a symbol, color, or other indicator of the infection, and a risk score can be generated. The risk score can represent a total number of infections reported at that location for a given infectious disease, a number of infections reported at that location over a defined window of time, or a number infections reported at that location, either in total or over a defined window of time divided by an area of the location to generate a value representing a density of infections in that location. The risk score for each location can be shown on the map.

Figure 11:
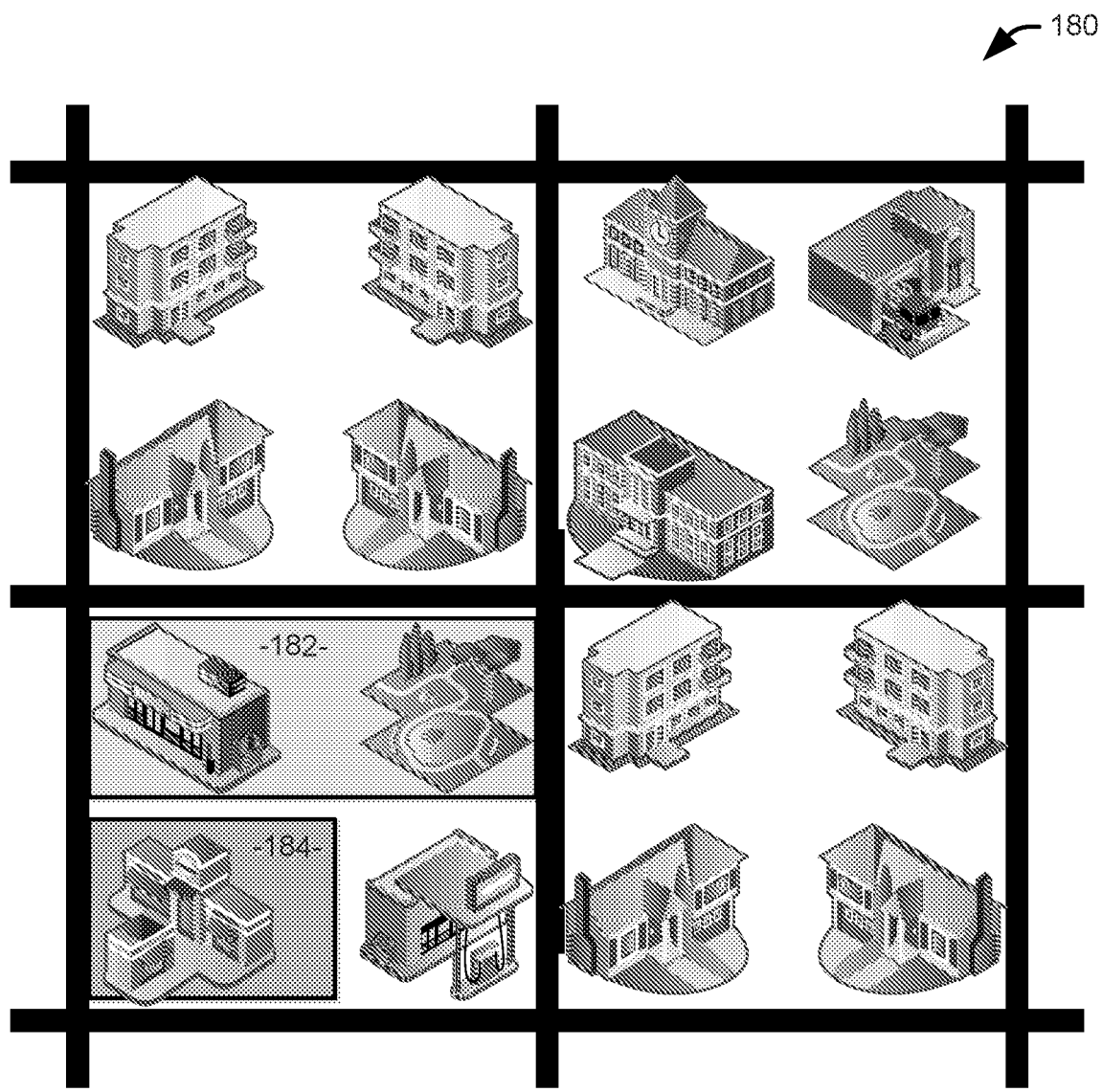
FIG. 11 illustrates a simplified example of a map of risk scores that could be generated for a target location.

FIG. 11 illustrates a simplified example of a map of risk scores 180 that could be generated for a target location. In the simplified example, the risk scores for locations are illustrated as three categorical values, with a first category representing no known risk of infection, a second category representing a low level of infection risk, and a third category representing an increased level of infection risk. In the illustrated map 180, the first level of infection risk is represented as locations with no shading, the second level of infection risk is represented as locations with light shading 182, and the third level of infection risk is represented as locations with darker shading 184. It will be appreciated that each categorical value can be provided by applying a defined or dynamic threshold to a continuous risk score generated for each location.

In one implementation, the thresholds used to define each category can be defined according to the characteristics of the user, for example, as represented by the user data 126, or by a determination of the user's resilience to infection as determined at the predicted model 124. For example, if a user is in a high-risk category for infection (e.g., older, immunocompromised, or comorbid condition), the threshold can be lowered to represent the user's increased risk of infection. Similarly, if the user's resilience is determined to be lowered at a given time, the thresholds can be temporarily lowered to represent the user's decreased ability to resist infection. Accordingly, the map can not only be personalized to a given user, but can be adjusted to represent the risk to the user at a specific time.

In addition, the generated index can be used as a preventative measure by advising a susceptible individual to avoid social contact or predicting and forecasting contagiousness. For example, an individual known to be susceptible to or about to become contagious with a particular infectious disease might engage in enhanced social distancing until their condition improves. Similarly, a supervisor might remove employees that are particularly susceptible or likely to become contagious from direct contact with customers, particularly in a health care setting. When both susceptibility and forecasted contagiousness can be obtained within a population, individuals forecasted to be contagious can be warned against contact with susceptible individuals within their social network, reducing the spread of the disease among vulnerable populations.

Figure 12:
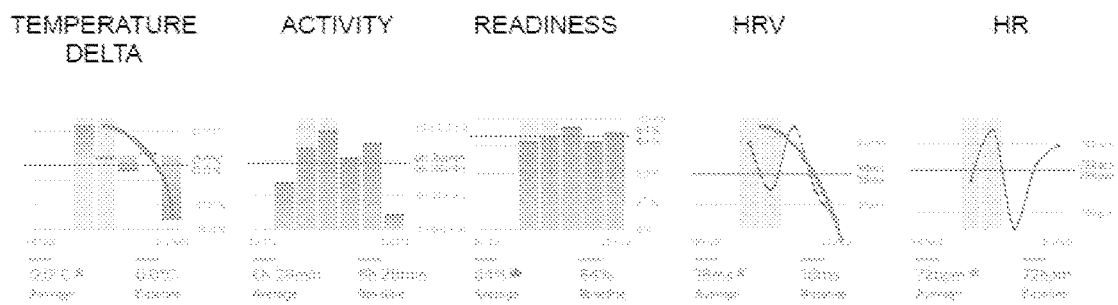
FIG. 12 illustrates graphs of several wellness-related parameters over a time period before an outbreak of an infectious disease.
Figure 13:
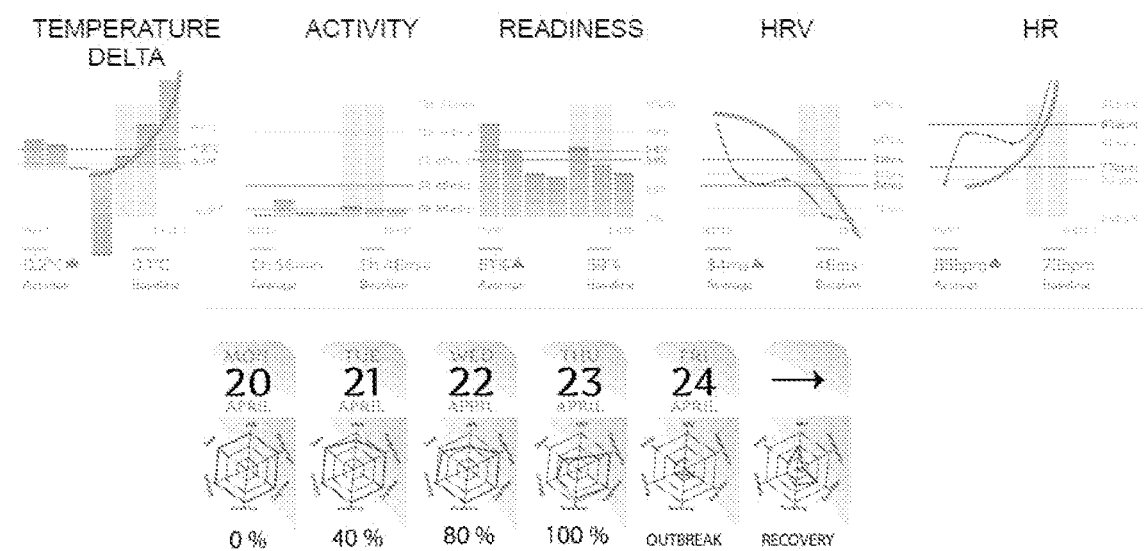
FIG. 13 illustrates graphs of the parameters of FIG. 12 during an outbreak.

Indices measuring resilience or likelihood of recovery can be used for allocating scarce medical resources. For example, individuals with a high resilience can be instructed, at least initially, to treat the disease as outpatients, as it is less likely they will develop symptoms requiring hospital care. Similarly, when drugs or medical equipment, such as ventilators, are in short supply, they can be given to patients with higher need or likelihoods of recovery to maximize the effectiveness of medical resources. In other instances the indices can guide diagnostic and medical status classifications and treatment options to be more effective by taking into account ones overall body resilience and Finally, the data for a given location of interest can be used to detect regions in which infections are likely to begin spreading. FIG. 12 illustrates several wellness-relevant parameters over a time period before an outbreak of an infectious disease. FIG. 13 illustrates the same parameters during an outbreak. It will be noted that the average body temperature and heart rate variability at the location of interest drops, while averages for heart rate as well as measures of readiness and activity fall as the outbreak progresses. It will be appreciated from FIG. 12, however, that each of these trends were evident before the outbreak was underway, and the use of the predictive model 140, specifically the evaluation of time series of these values at a recurrent network (e.g., a LSTM) can allow for prediction of the outbreak in time to take measures to reduce its severity.

Figure 14:
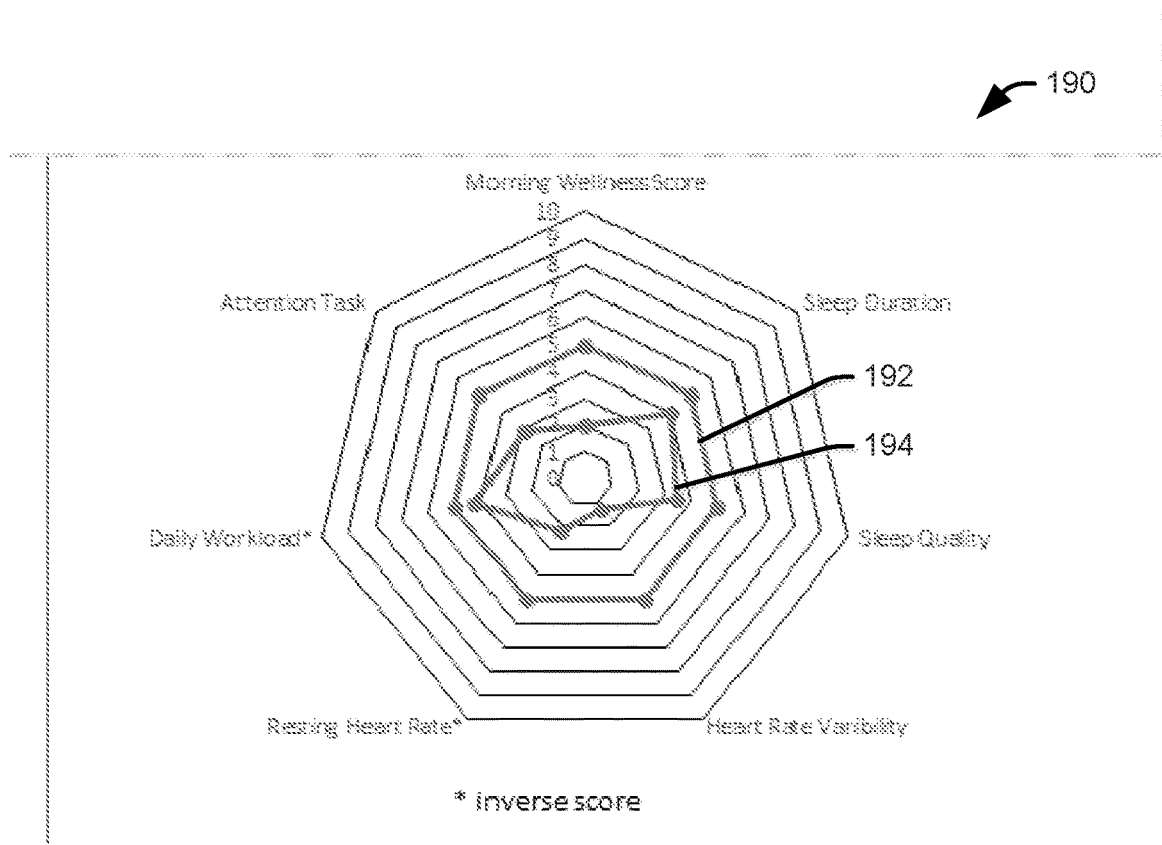
FIG. 14 illustrates a radar plot comparing average values for various wellness-relevant parameters for individuals infected with COVID-19 against the general population.

FIG. 14 illustrates a radar plot 190 comparing average values for a set of various wellness-relevant parameters for individuals infected with COVID-19 192 against average values for the set of various wellness-relevant parameters for the general population 194. As can be seen from the chart, individuals with COVID-19 suffer moderate reductions in sleep quality and sleep duration, and show significant reductions in attention, reported wellness, and heart rate variability. The patient's resting heart rate also increases significantly. The patient also experiences a slightly increased "workload," that is, the cost, in the form of additional stress and fatigue, of performing daily tasks. It will be appreciated that these wellness-relevant parameters can be of particular use in identifying the onset of COVID-19 infections in asymptomatic users.

Figure 15:
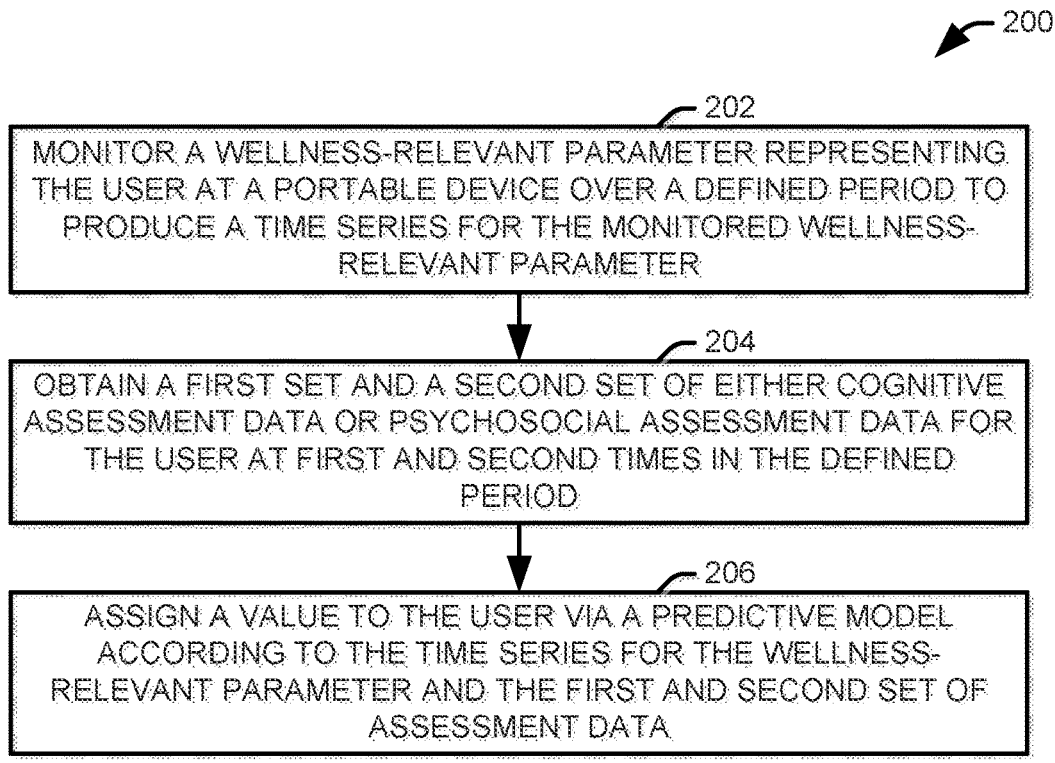
FIG. 15 illustrates one example of a method for monitoring the wellness of a user.
Figure 16:
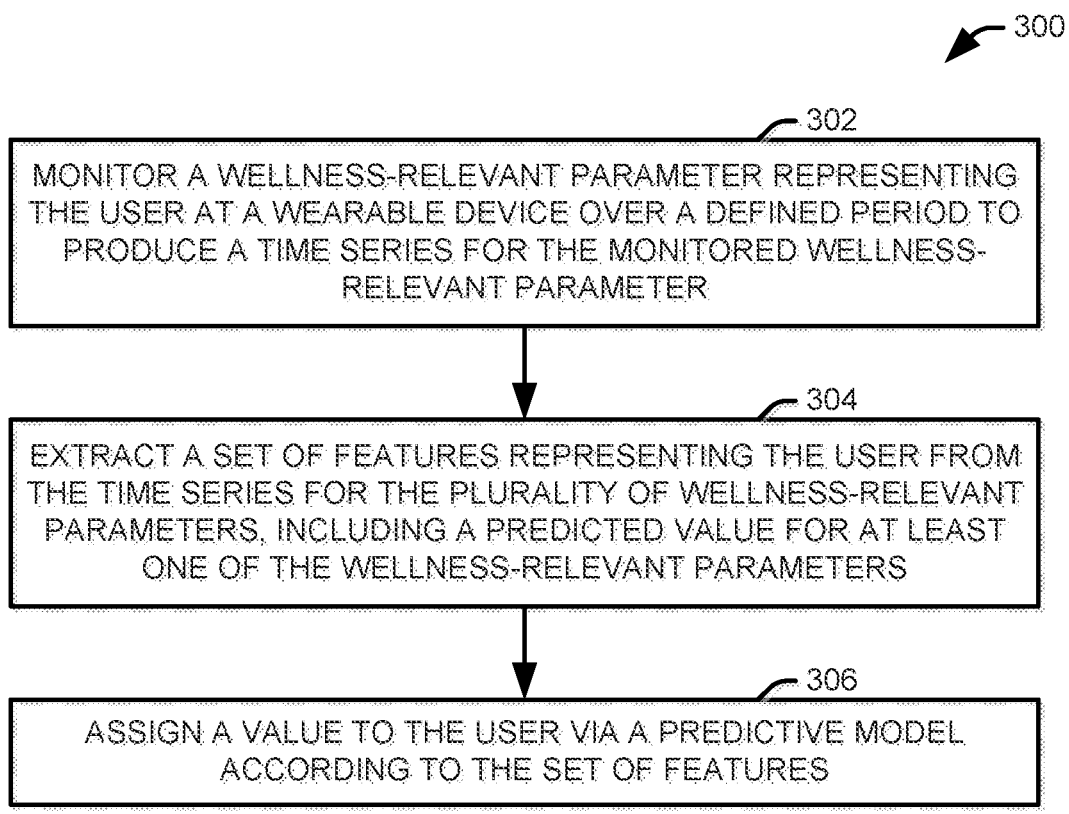
FIG. 16 illustrates another example for monitoring the wellness of a user.

In view of the foregoing structural and functional features described above, methods in accordance with various aspects of the present invention will be better appreciated with reference to FIGS. 15 and 16. While, for purposes of simplicity of explanation, the methods of FIGS. 15 and 16 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect the present invention.

FIG. 15 illustrates one example of a method for monitoring a wellness of a user. At 202, a wellness-relevant parameter representing the user is monitored at a portable device over a defined period to produce a time series for the wellness-relevant parameter. Examples of wellness-relevant parameters can include heart rate variability and body temperature, which can be monitored, for example, at a wearable device. At 204, a first set and a second set of either or both of cognitive assessment data and psychosocial assessment data are obtained for the user at respective first and second times in the defined period. In one example, the user is prompted to interact with a cognitive assessment application or psychosocial assessment application at a base unit, such as a mobile device, associated with the portable device to provide the first and second sets of assessment data.

At 206, a value is assigned to the user via a predictive model according to the time series for the wellness-relevant parameter and the first and second sets of either cognitive assessment data or psychosocial assessment data. In one example, the value represents a predicted risk posed to the user by a specific illness or class of illnesses, such as a predicted or forecasted contagiousness of the user, a predicted number of days until the user will be contagious with an infectious disease, or a predicted pathogen level from DNA, RNA or protein or antibody measurements in the nose, nasopharynx, mouth, blood or other body fluid.

In one implementation, the predictive model performs a wavelet decomposition on the time series for the wellness-relevant parameter to provide a set of wavelet coefficients. The wavelet coefficients can themselves be used as features for the predictive model or they can be aggregated into one or more composite features. For example, a weighted combination of at least a portion of the set of wavelet coefficients can be generated with the weights assigned during a training process of the predictive model. Alternatively, a center of mass of a two-dimensional array based on the set of wavelet coefficients can be generated to provide features for the predictive model. The predictive model can also use intermediate predictions as features in assigning the value. For example, future values for one or more wellness-related parameters can be predicted from the monitored data and then used as features in the predictive model.

In one example, the predictive model can utilize feedback to adjust parameters associated with the predictive model, for example, via retraining of the model or the use of a reinforcement learning process on one or more specific parameters, such as decision thresholds for generating categorical values from continuous outputs. In this implementation, an outcome associated with the user is measured and compared to the value assigned to the user via a predictive model. A parameter associated with the predictive model is changed according to this comparison.

FIG. 16 illustrates another example of a method for monitoring a wellness of a user. At 302, a plurality of wellness-relevant parameters representing the user are monitored at a wearable device over a defined period to produce respective time series for the monitored parameter. At 304, a set of features representing the user are extracted from the time series for the plurality of wellness-relevant parameters. The set of features includes a predicted value for at least one of the plurality of wellness-relevant parameters, such as heart rate variability or body temperature. At 306, a value is assigned to the user via a predictive model according to the set of features.

Figure 17:
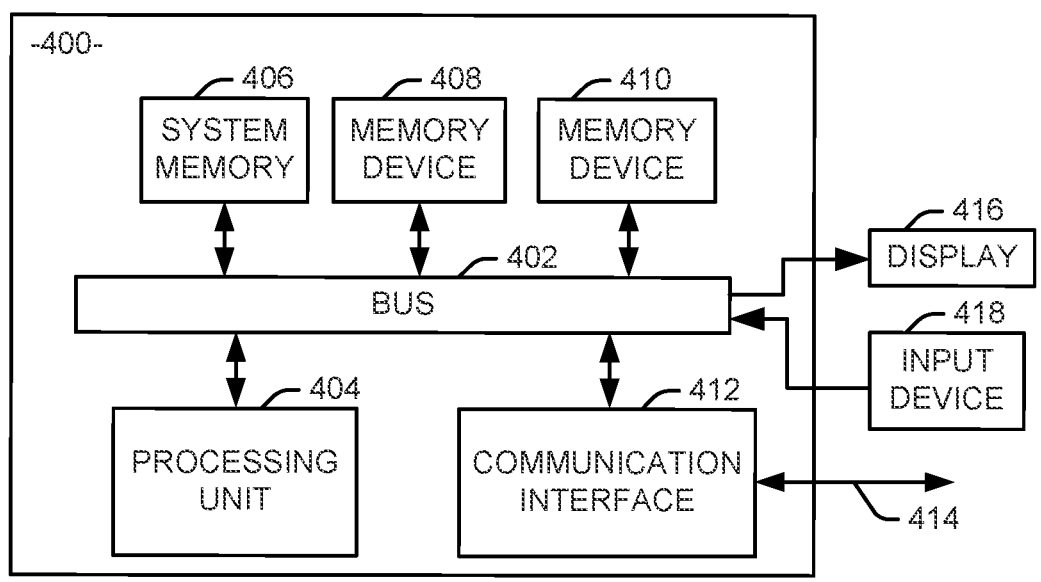
FIG. 17 is a schematic block diagram illustrating an exemplary system of hardware components.

FIG. 17 is a schematic block diagram illustrating an exemplary system 400 of hardware components capable of implementing examples of the systems and methods disclosed herein. The system 400 can include various systems and subsystems. The system 400 can be a personal computer, a laptop computer, a workstation, a computer system, an appliance, an application-specific integrated circuit (ASIC), a server, a server BladeCenter, a server farm, etc.

The system 400 can include a system bus 402, a processing unit 404, a system memory 406, memory devices 408 and 410, a communication interface 412 (e.g., a network interface), a communication link 414, a display 416 (e.g., a video screen), and an input device 418 (e.g., a keyboard, touch screen, and/or a mouse). The system bus 402 can be in communication with the processing unit 404 and the system memory 406. The additional memory devices 408 and 410, such as a hard disk drive, server, standalone database, or other non-volatile memory, can also be in communication with the system bus 402. The system bus 402 interconnects the processing unit 404, the memory devices 406-410, the communication interface 412, the display 416, and the input device 418. In some examples, the system bus 402 also interconnects an additional port (not shown), such as a universal serial bus (USB) port.

The processing unit 404 can be a computing device and can include an application-specific integrated circuit (ASIC). The processing unit 404 executes a set of instructions to implement the operations of examples disclosed herein. The processing unit can include a processing core.

The additional memory devices 406, 408, and 410 can store data, programs, instructions, database queries in text or compiled form, and any other information that may be needed to operate a computer. The memories 406, 408, and 410 can be implemented as computer-readable media (integrated or removable), such as a memory card, disk drive, compact disk (CD), or server accessible over a network. In certain examples, the memories 406, 408 and 410 can comprise text, images, video, and/or audio, portions of which can be available in formats comprehensible to human beings.

Additionally or alternatively, the system 400 can access an external data source or query source through the communication interface 412, which can communicate with the system bus 402 and the communication link 414.

In operation, the system 400 can be used to implement one or more parts of a system for monitoring a wellness of a user in accordance with the present invention. Computer executable logic for implementing the monitoring system resides on one or more of the system memory 406, and the memory devices 408 and 410 in accordance with certain examples. The processing unit 404 executes one or more computer executable instructions originating from the system memory 406 and the memory devices 408 and 410. The term "computer readable medium" as used herein refers to a medium that participates in providing instructions to the processing unit 404 for execution. This medium may be distributed across multiple discrete assemblies all operatively connected to a common processor or set of related processors. Specific details are given in the above description to provide a thorough understanding of the embodiments. However, it is understood that the embodiments can be practiced without these specific details. For example, physical components can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps, and means described above can be done in various ways. For example, these techniques, blocks, steps, and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method for monitoring a wellness of a user, the method comprising:
   monitoring a one of a heart rate or a heart-rate variability of the user at a heart rate sensor over a defined period to produce a time series for the one of heart rate or heart rate variability;
   obtaining a first set and a second set of one of cognitive assessment data and psychosocial assessment data for the user at respective first and second times in the defined period;
   assigning a value representing a wellness of to the user via a recurrent neural network according to the time series for the one of the heart rate or the heart-rate variability, the first set of one of cognitive assessment data and psychosocial assessment data, and the second set of one of cognitive assessment data and psychosocial assessment data, wherein the assigning a value to the user comprises:
      performing a wavelet decomposition on the time series for the one of the heart rate or the heart-rate variability to provide a two-dimension array of wavelet coefficients across first and second variables and generating a center of mass of the two-dimensional array based on the set of wavelet coefficients as a first representative value for the first variable and a second representative value for the second variable; and
      assigning the value according to at least the first and second representative values;
   measuring an outcome associated with the user;
   comparing the measured outcome to the value assigned to the user the recurrent neural network; and
   changing a parameter associated with the recurrent neural network according to the comparison of the measured outcome to the value assigned to the user via the recurrent neural network by generating a reward for a reinforcement learning process based on a similarity of the measured outcome to the value assigned to the user.

2. The method of claim 1, wherein the parameter associated with the recurrent neural network is a decision threshold used to assign the value to the user as a categorical value from a continuous index provided by the recurrent neural network.

3. The method of claim 1, wherein the value represents a predicted risk posed to the user by a specific illness or class of illnesses.

4. The method of claim 3, wherein the value represents a predicted or forecasted contagiousness of the user.

5. The method of claim 4, wherein the value represents a predicted number of days until the user will be contagious with an infectious disease.

6. The method of claim 3, wherein the value represents a predicted pathogen level from DNA, RNA or protein or antibody measurements in the nose, nasopharynx, mouth, or a bodily fluid.

7. The method of claim 1, wherein assigning the value to the user via the recurrent neural network comprises:
   assigning the user a first value representing a future value of the one of the heart rate or the heart-rate variability according to the time series for the one of the heart rate or the heart-rate variability, the first set of one of cognitive assessment data and psychosocial assessment data, and the second set of one of cognitive assessment data and psychosocial assessment data; and
   assigning the value to the user according to at least the first value.

8. A system comprising:
   a heart rate sensor that monitors one of a heart rate or a heart-rate variability of a user over a defined period to produce a time series for the heart rate variability;
   a feature extractor that performs a wavelet decomposition on the time series for the one of the heart rate or the heart-rate variability to provide a two-dimensional array of wavelet coefficients across first and second variables and generates a center of mass of the two-dimensional array of wavelet coefficients as a first representative value for the first variable and a second representative value for the second variable;
   a portable device that receives a first set and a second set of one of cognitive assessment data and psychosocial assessment data for the user at respective first and second times in the defined period;
   a recurrent neural network that assigns an index representing a wellness of the user according to the first representative value, the second representative value, the first set of one of cognitive assessment data and psychosocial assessment data, and the second set of one of cognitive assessment data and psychosocial assessment data; and a reinforcement learning model that continuously refines a decision threshold applied to the index representing the user to assign a categorical parameter representing a wellness of the user.

9. The system of claim 8, wherein the first set and second set of one of cognitive assessment data and psychosocial assessment data are the first set and the second set of cognitive assessment data and the portable device includes a user interface that allows the user to interact with a cognitive assessment application at a base unit associated with the wearable device to provide the first set of cognitive assessment data and the second set of cognitive assessment data.

10. The system of claim 8, wherein the recurrent neural network assigns a first value to the user representing a future value of the one of the heart rate or the heart-rate variability according to the time series for the one of the heart rate or the heart-rate variability and assigns the value to the user according to at least the first value.

* * * * *